Jan. 9, 1962　　W. M. FAHY　　3,015,995
APPARATUS FOR REMOVING WELDING FLASH AND
SWELLING FROM ROD STOCK
Filed April 30, 1959　　2 Sheets-Sheet 1

INVENTOR.
WILLIAM M. FAHY
BY John W. Hoag
ATTORNEY

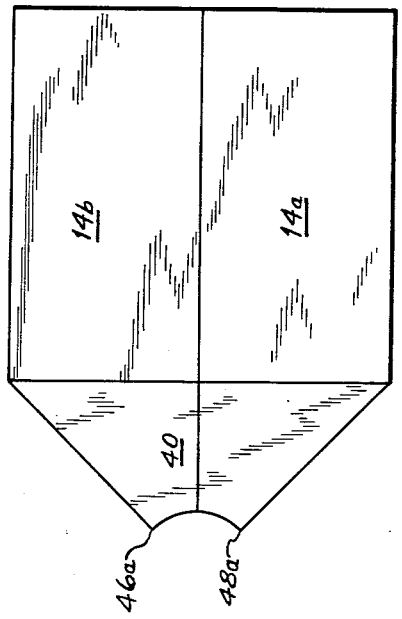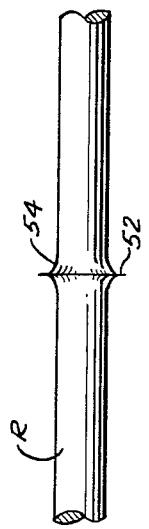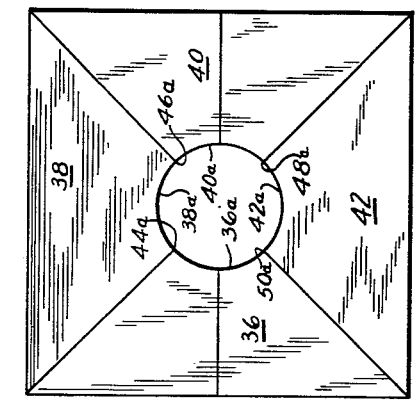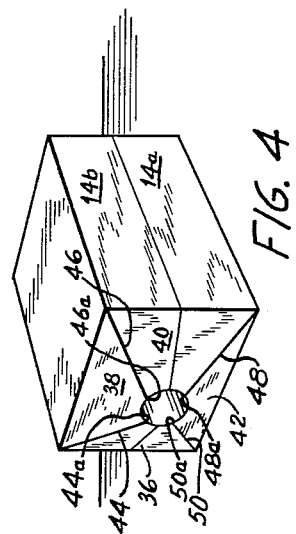

United States Patent Office 3,015,995
Patented Jan. 9, 1962

3,015,995
APPARATUS FOR REMOVING WELDING FLASH
AND SWELLING FROM ROD STOCK
William M. Fahy, 128 Oklahoma Ave., Oriskany, N.Y.
Filed Apr. 30, 1959, Ser. No. 810,070
7 Claims. (Cl. 90—24)

This invention relates to apparatus for removing the flash of metal, which occurs at the interface of two rod ends when they are welded together, and the swelling in the welded rod which occurs on either side of the weld.

It is current practice to remove the flash and reduce the swelling by use of a coarse hand file. This is time consuming and also objectionable because the result of such filing is uncertain and the resulting rod stock is often unsymmetrical and often rough or gouged. A clean symmetrical result is important, for example in the drawing of wire from such welded rods for the welded stock must be of uniform diameter to pass through wire drawing dies and the final wire product must be free of surface defects.

The term "rod" is used herein in a broad sense and includes stock of a diameter which may be referred to as "wire."

It is an object of this invention to provide apparatus which will quickly and dependably remove excess metal from rods, and particularly excess metal resulting from flash and swelling where two rods are butt welded, leaving a uniform, symmetrical result that insures freedom from surface defects in the drawn wire.

Another object of the invention is to provide such apparatus which is simple, durable and easy to operate.

The invention will best be understood if read in connection with the following drawings in which FIGURE 1 is a perspective view of an embodiment of the invention;

FIGURE 2 is an end view taken on the line 2—2 of FIGURE 1;

FIGURE 3 is a side elevation of the cutter head assembly;

Figure 1:
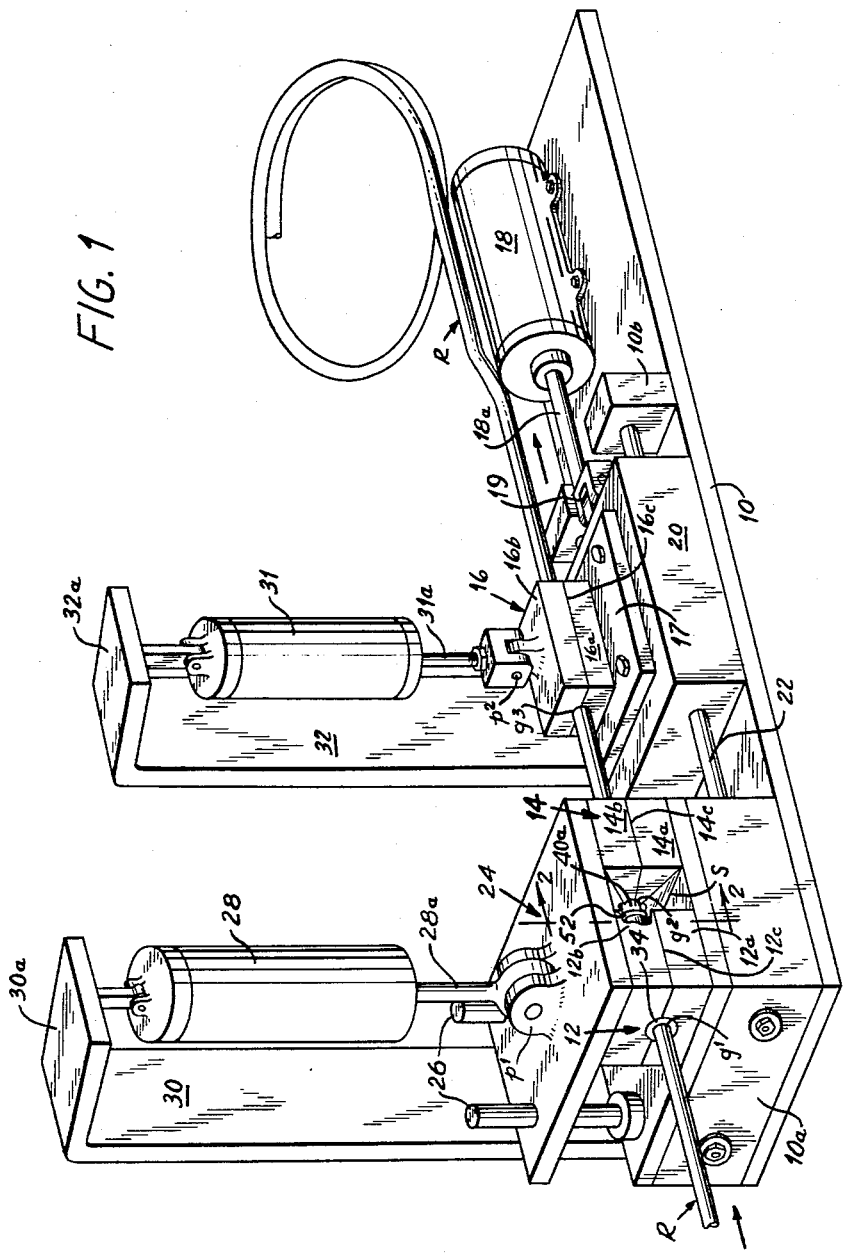

FIGURE 4 is a perspective view of the cutter head assembly shown in FIGURES 2 and 3, showing, how the anglarly related faces 36, 40 and 42 meet along the lines 44, 46, 48 and 50, the forward ends of which constitute the sharp cutting points 44a, 48a and 50a respectively, and FIGURE 5 is a plan view of a portion of welded rod stock showing flash 52 of metal caused by the welding at the interface of the two rod portions at the time of welding, and the swelling 54 which is occasioned at the same time adjacent to and at either side of the flash metal 52.

In the embodiment of the invention illustrated in the drawings the apparatus comprises, a base 10 on which are supported coacting elements including a guide assembly 12, the cutter head assembly 14, a sliding clamp 16, and a means of moving the clamp such as the cylinder 18.

The guide 12 and the head 14 are shown mounted on the same base member 10a but spaced apart. Clamp 16 is shown mounted on a slide 20, and cylinder 18 is shown disposed directly on base 10 with its piston 18a on a level with the slide 20. The latter is slidable on guide bars 22 which extend through and between base member 10a and the base member 10b.

Guide 12, cutter head 14 and clamp 16 are each divided, along the lines 12c, 14c and 16c respectively, to provide for insertion and removal of a length of rod R. The abutting faces of the parts of the guide, cutter head and clamp are grooved with the semicircular grooves $g^1$, $g^2$, and $g^3$, respectively, providing a seat in the clamp, and a passage in the guide, and in the cutter head within which rods may be moved axially as will be described.

The lower portions 12a of guide 12 and 14a of the cutter head 14 are securely fastened to base member 10a with a space s between them, and the upper portions 12b and 14b are similarly spaced apart and fastened to pressure plate 24, which is vertically slidable on guide pins 26 which are anchored in base member 10a. A fluid cylinder 28 is shown interconnected between the top of plate 24 and the horizontally extending arm 30a of a bracket or yoke 30 fastened to and extending upwardly from the base member 10a. Plate 24 is connected, as by pin $p^1$ to the piston 28a of an air cylinder 28 and may be lifted by action of the cylinder, to permit the guide part 12b and the cutter head part 14b to be separated from guide part 12a and cutter head part 14a respectively, and lowered to bring the guide parts and the cutter head parts into register. The upper portions 12b of the guide and 14b of the cutter head may thus be lifted simultaneously by lifting the plate 24, thus giving access to the lower guide and cutter head parts 12a and 14a respectively, permitting a length of rod to be positioned in, or removed from the grooves $g^1$, $g^2$, in the lower faces of said parts, respectively.

The lower clamp part 16a is shown provided with a wider base portion 17 which is fastened to slide 20. As shown herein the portion 17 is a horizontally extending lower end portion of the bracket or yoke member 32. The upper clamp part 16b is connected, as by pin $p^2$, to the lower end of the piston rod 31a of an air cylinder 31 the upper end of which is connected to the horizontally extending arm 32a of a bracket or yoke 32.

Slide member 20, which is slidable on base 10 between the upright base extensions 10a and 10b, is connected as by pin and clevis 19 to the piston 18a of the air cylinder 18 which may be operated by known means to move the slide 20 and thereby also move a length of rod which is clamped in clamp 16.

The grooves $g^1$, $g^2$, and $g^3$ in the guide, cutter head and clamp parts respectively are of course axially aligned. The grooves $g^1$ of the guide parts form a tubular passage slightly larger in diameter than the rod diameter. This permits the rod to slide through the closed guide which acts both as a straightener and as a guide for the rod as it moves in the direction indicated by the arrow. The faces of the guide parts 12a and 12b are slightly concave around the entrance end of the grooves $g^1$, as shown at 34, to avoid entrance friction and possible abrasion of the surface of the rod R as it is moved forward into the cutter head.

While the body of the cutter head is shown, FIGURE 3, rectangular, the leading portion of the cutter head has four substantially flat and inwardly inclined faces 36, 38, 40 and 42, the leading edges 36a, 38a, 40a and 42a of which coact to form an orifice 44, FIGURE 2, which in the illustrated embodiment of the invention is circular. These edges are thin cutting edges the lateral margins of which project forwardly of their intermediate portions and meet substantially at right angles along lines 44, 46, 48 and 50 the forward ends of which constitute the sharp cutting points 44a, 46a, 48a and 50a respectively. The cutting edges have a very effective shearing action and the points have a very effective piercing effect. Acting jointly the points and cutting edges provide a very efficient cutter for removing surface portions of the rod which project beyond the desired rod diameter, which is of course the diameter of the orifice defined by the leading edges of the inclined faces 36, 38, 40 and 42, which are suitably proportioned. The cutting edges are especially well adapted to shear off the flash metal at the point of weld, best indicated at 52 in FIGURE 5, and the excess of metal adjacent the point of weld, which is caused by swelling during the welding operation and is best illustrated at 54 in FIGURE 5.

The diameter of the passage in the cutter head may be increased slightly beyond the cutting edge to facilitate drawing the rod stock through this passage during the operation of the device. The length of the cutter head may be varied, but I have found it desirable to have some confining passage beyond the cutting orifice 44 to steady and guide the rod and help keep it straight.

The diameter of the seat provided in the clamp 16 by the grooves $g^3$ in the opposed faces of the clamp parts is slightly smaller than the rod, causing the rod to be held by the clamp without slippage while the clamp is moved away from the cutter head to draw an enlarged portion of the rod into the cutter head and past its cutting edges.

In the operation of the device the upper parts of the guide, cutter head and clamp are elevated and a length of rod is placed in the aligned, semi-circular grooves $g^1$, $g^2$, and $g^3$ in the lower parts 12a, 14a, and 16a of the guide, cutter head and clamp, with a point of weld disposed in the space S between guide 12 and cutter head 14. This space is large enough to receive the portion of the welded rod which is enlarged by the flash metal 52, at the point of weld, marking the original interface of two rod portions which have been welded, and the portions of the welded rod on either side of said original interface. The parts 12b, 14b and 16b are then lowered into place, to complete the guideway in member 12, the cutter orifice and passage in member 14, and to provide a firm grip around the rod in the clamp 16. The source of power 18 is then actuated to move slide 20 away from base member 10a thus drawing the rod through the guide and cutter head a distance sufficient to advance the enlarged portion of the rod past the cutting edge of the cutter head, thus reducing the enlarged portion to the desired size. The welded rod is quickly released and ready for drawing into wire or further processing.

As shown herein the cutter head part 14a comprises all of the inclined face 42 and half of the faces 36 and 40 respectively, and part 14b comprises all of the inclined face 38 and the other halves of faces 36 and 40.

There has thus been provided apparatus in which the above stated objects have been attained in a thoroughly practical manner.

What I claim is:

1. A device of the kind described comprising, a base, a first pedestal fixed on said base, upright frame means fixed on said base in spaced relation to said first pedestal, guide bars extending between said first pedestal and said upright frame means, a second pedestal slidingly mounted on said guide bars, and means for moving said second pedestal on said guide bars, a first guide member fixed on said first pedestal, a second guide member superimposed upon said first guide member, and means for raising and lowering said second guide member relative to said first guide member, the meeting faces of said guide members being grooved with complementary grooves forming a guideway, a first die member fixed on said first pedestal, a second die member superimposed on said first die member, and means for raising and lowering said second die member relative to said first die member, the meeting faces of said die members being grooved with said complementary grooves to provide a passage which is aligned with the said guideway, said die members coacting to provide a cutter head, a first clamp member fixed on said second pedestal, a second clamp member superimposed on said first clamp member, and means movable with said second pedestal for raising or lowering said second clamp member with respect to the first clamp member, the meeting faces of said clamp members being grooved with complementary grooves for frictionally engaging and holding a length of rod stock while the clamp members are moved with said second pedestal to draw the point of weld of the rod stock through said cutter head.

2. The device claimed in claim 1 in which the means for raising and lowering the second guide member and the second die member is a common means to which both the second guide member and the second die member are attached in spaced relation.

3. The device claimed in claim 1 in which the means for raising and lowering the second guide member and the second die member includes a platen, vertical guide means for the platen, an angle bracket extending upwardly from the base, and fluid cylinder means interconnected between the platen and an overhanging arm of said angle bracket.

4. The device claimed in claim 1 in which the means for raising and lowering the upper clamp member comprises an angle bracket attached at its lower end to said second pedestal and extending upwardly from the second pedestal, and fluid cylinder means interconnected between the upper clamp member and an overhanging arm of said angle bracket.

5. The device claimed in claim 1 in which the means for raising and lowering the upper guide member and the upper die member includes a platen, a first single bracket, projecting upwardly from the first pedestal, and means interconnected between the platen and an overhanging arm of said angle bracket, and the means for raising and lowering the upper clamp member includes a second angle bracket, attached at its lower end to said second pedestal and extending upwardly from the second pedestal, and means interconnected between the upper clamp member and an overhanging arm of said second angle bracket.

6. A device of the kind described comprising, a guide assembly, a cutter head assembly, a sliding clamp assembly, a base member common to all of said assemblies, on which all of said assemblies are longitudinally aligned, and a slideway for said sliding clamp assembly disposed longitudinally of the base, said guide assembly comprising a lower guide member fixed to said base and an upper guide member superimposed upon said lower guide member, the cutter head assembly comprising a lower member fixed to said base and an upper member superimposed upon said first member, and means for simultaneously raising and lowering said upper guide member and said upper die member, said sliding clamp assembly comprising upper and lower members which are movable on said slideway and means movable with the clamp members for raising and lowering the upper clamp member, and means for moving said clamp assembly toward and away from the guide and cutter head members.

7. A device of the kind described comprising in alignment a guide assembly, a cutter head assembly, a sliding clamp assembly, and a slideway for said sliding clamp assembly, said guide assembly comprising a lower fixed guide member and an upper guide member superimposed upon said lower guide member, the cutter head assembly comprising a lower fixed member and an upper member superimposed upon said lower member, said sliding clamp assembly comprising a lower member and an upper member superimposed upon said lower member, means for raising and lowering said upper guide member, said upper cutter head member, and said upper clamp member respectively, with respect to their lower members, and means for moving the sliding clamp assembly relative to said other two assemblies.

References Cited in the file of this patent

UNITED STATES PATENTS

| | | |
|---|---|---|
| 1,832,719 | McBerty | Nov. 17, 1931 |
| 2,015,452 | Jenkins et al. | Sept. 24, 1935 |
| 2,124,849 | Drain | July 26, 1938 |
| 2,202,910 | Iversen | June 4, 1940 |
| 2,233,928 | Weaver | Mar. 4, 1941 |
| 2,272,737 | Chapman | Feb. 10, 1942 |
| 2,852,985 | Schlatter | Sept. 23, 1958 |